Oct. 15, 1929.  C. W. TODD  1,731,510
FRAME FOR RAILROAD VEHICLES AND METHOD OF MANUFACTURING THE SAME
Filed March 28, 1928  2 Sheets-Sheet 1
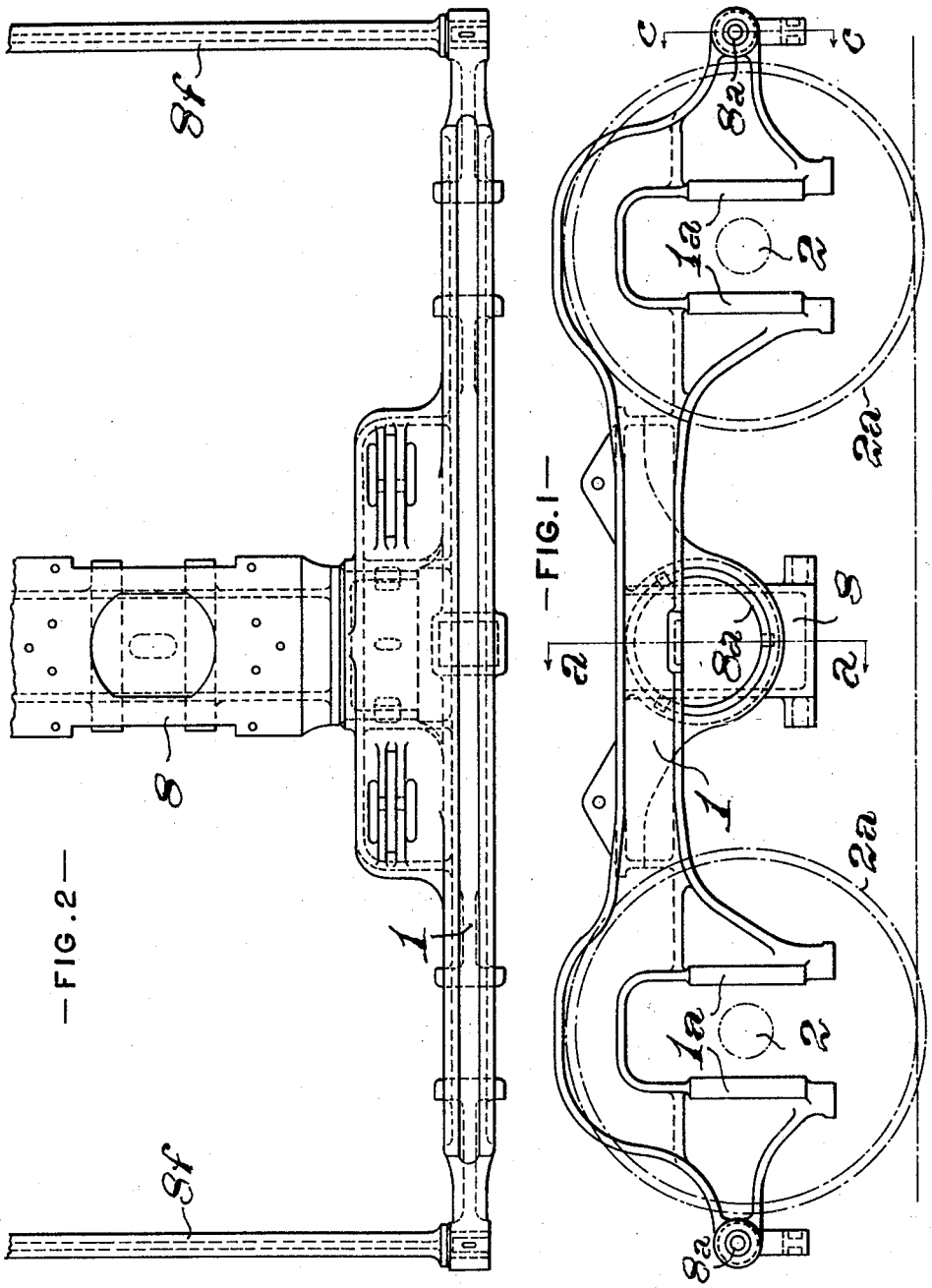

Oct. 15, 1929.  C. W. TODD  1,731,510
FRAME FOR RAILROAD VEHICLES AND METHOD OF MANUFACTURING THE SAME
Filed March 28, 1928  2 Sheets-Sheet 2
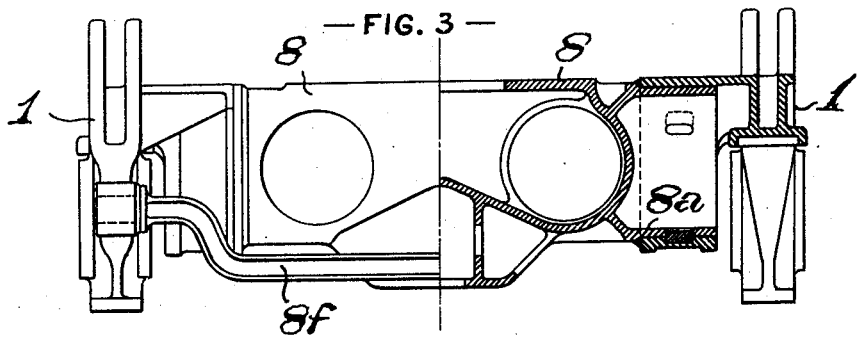
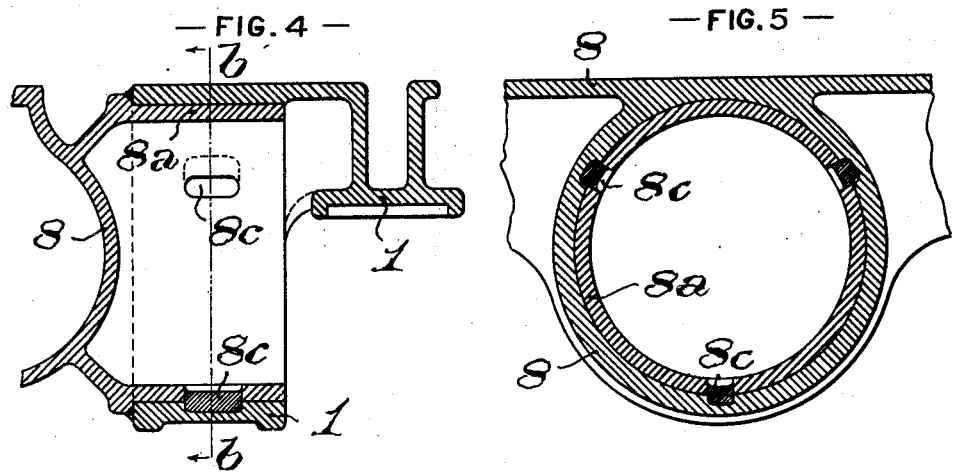
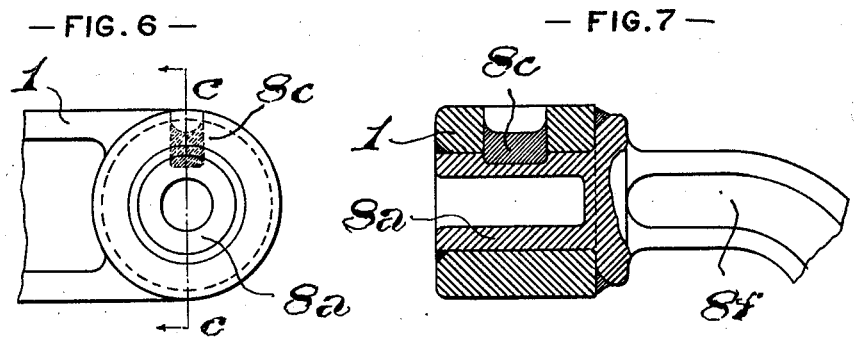
WITNESSES
INVENTOR Patented Oct. 15, 1929

1,731,510

UNITED STATES PATENT OFFICE

CHARLES W. TODD, OF SCHENECTADY, NEW YORK

FRAME FOR RAILROAD VEHICLES AND METHOD OF MANUFACTURING THE SAME

Application filed March 28, 1928. Serial No. 265,387.

This invention relates to the supporting frames of railroad vehicles and methods of manufacturing the same, and an object is to provide a fabricated structure of such type, which will be of strong and simple construction; will be economical in cost of manufacture; will effect a substantial reduction in the number of separate and connected accessory members; and will ensure accurate alignment of its side members by permitting the necessary boring and slotting thereof, to be performed in pairs. Another object of the invention is to provide an improved method of fastening the parts together.

The improvement claimed is hereinafter fully set forth.

In the accompanying drawings: Figure 1 is a side view, in elevation, of a truck for a railroad vehicle, illustrating an embodiment of the invention; Fig. 2, a half plan view of the same; Fig. 3, a view, the right hand half of which is a vertical transverse section, on the line $a\,a$ of Fig. 1, and the left hand half, a front elevation. Fig. 4, a partial section, on an enlarged scale, on the line $a\,a$ of Fig. 1; Fig. 5, a transverse section on a similar scale, on the line $b\,b$ of Fig. 4; Fig. 6, a side view, in elevation and on an enlarged scale of one of the end portions of a side member, and; Fig. 7, a vertical transverse section, on the line $c\,c$ of Figs. 1 and 6.

In the practice of the invention, referring descriptively to the specific embodiment thereof in a four wheeled truck for railroad vehicles, which is herein exemplified, the frame comprises two counterpart side members, 1, 1, which may be of any desired transverse section, on each of which there are formed, pairs of pedestal jaws, $1^a$, for the reception, in the usual manner, of the journal boxes of the axles, 2, on which the wheels, $2^a$, that support the truck, are secured.

The side members 1, 1, are connected one to the other, at the proper distance apart to present a frame structure of desired and determined width by a plurality of cross tie members, the number, and disposition of which, longitudinally in the structure, will be governed by the particular application and operative functions for which it is designed. In the instance exemplified, the cross tie members comprise a transom, 8, located at the middle of the length of the frame, and ties, $8^t$, of smaller transverse section, one of which extends across the frame, at each of its ends.

Each of the cross tie members is formed integral with a hollow cylindrical junction section, $8^a$, which extends from an end of the member, in line axially with the body portion thereof. The connection of the cross tie members to the side members, is effected by fitting the cylindrical junction pieces of the cross tie members in corresponding openings in the side members, and pressing them thereinto, the joined surfaces being, preferably, thereafter sealed and more rigidly secured together, by fusion of the contacting members of the joints. The rigidity of the connection may also be further assured by keys, $8^c$, extending through the side members and into the cross tie members, as shown in Figs. 3 to 7 inclusive, said keys being formed in recesses provided therefor by metal fused thereinto.

It has been developed by experimental tests, that in applications of the invention in which the rigidity of the connection of the cross tie members with the side members is desired to be increased by the fusion of the contacting surfaces together, as hereinbefore specified, such fusion is most effectively accomplished by the operation known in the art as "atomic hydrogen fused arc welding", in which operation, the electric arc is surrounded by an envelope of hydrogen gas, and the flame puddles the welding metal pencil, and also the metal itself of the contacting portions of the joined members, resulting in actual fusion of the metal of said members, at their joints.

While the invention is not necessarily limited to said above specified method of welding, and contemplates the practice of any other that may prove to be of sufficient value to be deemed satisfactory and efficient, such specific method is believed to be a most efficient and desirable one, and for this reason, is recommended in the practice of the invention.

The invention claimed and desired to be secured by Letters Patent, is:

1. In a fabricated frame for railroad vehicles, the combination of two side members, each comprising, in an integral part, a top rail and pedestal jaws depending therefrom; and cross tie members, connecting said side members, and having their end portions secured by fusion in corresponding openings in the side members.

2. In a fabricated frame for railroad vehicles, the combination of two side members, each comprising, in an integral part, a top rail and pedestal jaws depending therefrom; and cross tie members, connecting said side members, and having their end portions fitted, and pressed into corresponding openings in the side members, and the joined surfaces sealed by a weld or fusion of the contacting portions of the members.

3. In a fabricated frame for railroad vehicles, the combination of two side members, each comprising, in an integral part, a top rail and pedestal jaws depending therefrom; and cross tie members, connecting said side members, and having their end portions fitted in, and pressed into, corresponding openings in the side members, and the joined surfaces sealed by a weld or fusion of the contacting portion of the members, and further secured by a key.

4. In a fabricated frame for railroad vehicles, the combination of two side members, each comprising, in an integral part, a top rail and pedestal jaws depending therefrom; and cross tie members, connecting said side members, and having their end portions fitted, and secured rigidly, in corresponding openings in the side members, and the joined surfaces sealed by an atomic hydrogen fused arc weld.

5. The improvement in the method of manufacturing fabricated frames for railroad vehicles, which consists in rigidly connecting two side members, each comprising, in an integral part, a top rail and pedestal jaws depending therefrom, by fitting cross tie members, of length proper to space the side members at a determined distance apart, and having tubular cylindrical end portions, in openings in the side members, of diameters corresponding with those of the end portions of the cross tie members, and securing said end portions in said openings by a weld or fusion of the contacting portion of the members.

6. The improvement in the method of manufacturing fabricated frames for railroad vehicles, which consists in rigidly connecting two side members, each comprising, in an integral part, a top rail and pedestal jaws depending therefrom, by fitting cross tie members, of length proper to space the side members at a determined distance apart, and having tubular cylindrical end portions, in openings in the side members, of diameters corresponding with those of the end portions of the cross tie members, and securing said end portions in said openings, by expanding them therein.

7. The improvement in the method of manufacturing fabricated frames for railroad vehicles, which consists in rigidly connecting two side members, each comprising in an integral part, a top rail and pedestal jaws depending therefrom, by fitting cross tie members, of length proper to space the side members at a determined distance apart, and having tubular cylindrical end portions, in openings in the side members, of diameters corresponding with those of the end portions of the cross tie members, and securing said end portions in said openings, by expanding them therein, and sealing the joined surfaces by a weld or fusion of the contacting portions of the members.

8. The improvement in the method of manufacturing fabricated frames for railroad vehicles, which consists in rigidly connecting two side members, each comprising, in an integral part, a top rail and pedestal jaws depending therefrom, by fitting cross tie members, of length proper to space the side members at a determined distance apart, and having tubular cylindrical end portions, in openings in the side members, of diameters corresponding with those of the end portions of the cross tie members, and securing said end portions in said openings, by expanding them therein, and sealing the joined surfaces by a weld or fusion of the contacting portions of the members, and further securing them by keying.

9. The improvement in the method of manufacturing fabricated frames for railroad vehicles, which consists in rigidly connecting two side members, each comprising, in an integral part, a top rail and pedestal jaws depending therefrom, by fitting cross tie members, of length proper to space the side members at a determined distance apart, and having tubular cylindrical end portions, in openings in the side members, of diameters corresponding with those of the end portions of the cross tie members, and securing said end portions in said openings and sealing the joined surfaces, by an atomic hydrogen fused arc weld.

CHARLES W. TODD.